Patented Sept. 5, 1939

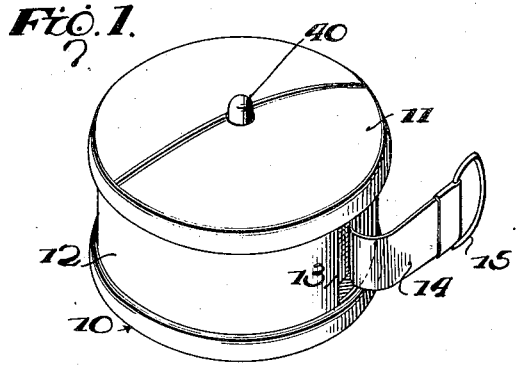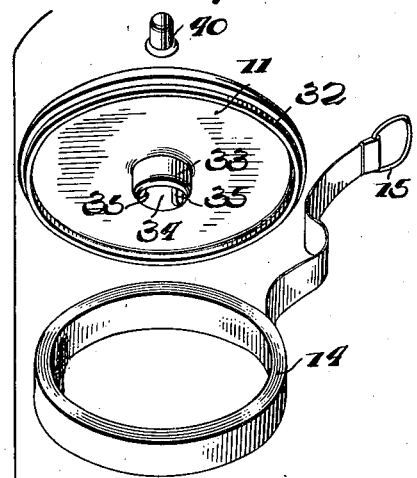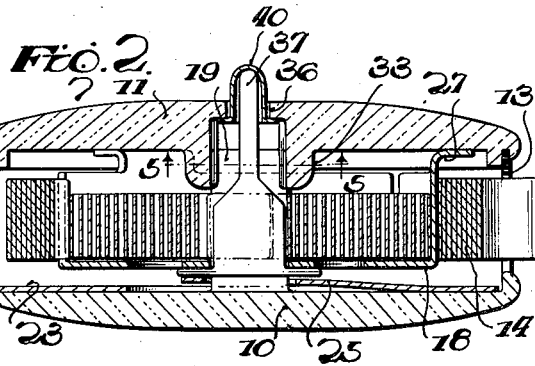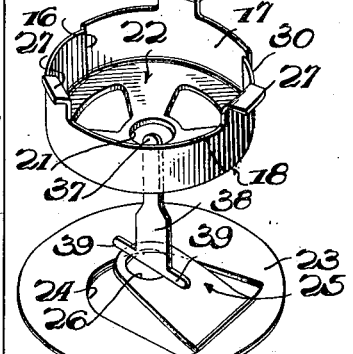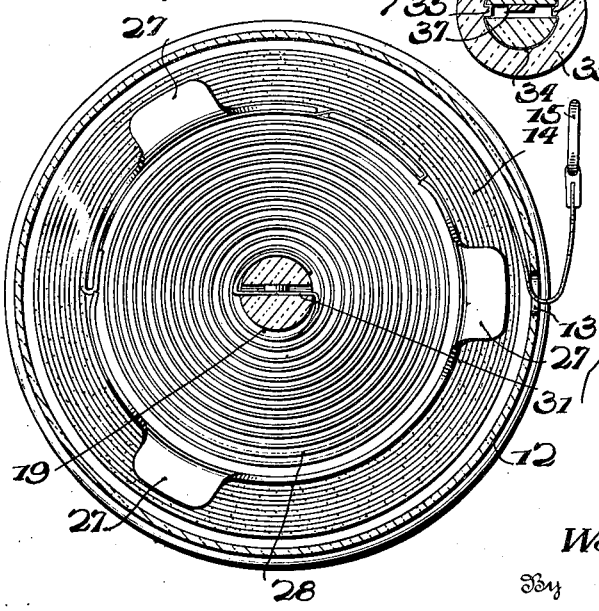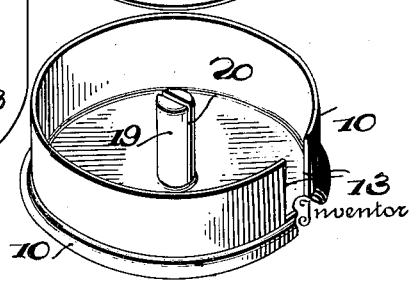

2,172,043

UNITED STATES PATENT OFFICE 2,172,043

SPRING REEL TAPE MEASURE

Wallace J. Wolf, Rochester, N. Y., assignor to Bastian Brothers Company, Rochester, N. Y., a corporation of New York Application December 19, 1938, Serial No. 246,710

4 Claims. (Cl. 242—84.9)

The present invention relates generally to tape measures and more particularly to flexible measuring tapes of the well-known spring reel type, and the invention has for its primary object the improvement of existing structures of this general type of tape measure, in respect to economy of construction, durability in use, and ease and facility in the assembly of the several parts thereof.

With these general objects in mind, other and further objects relating more particularly to the detailed construction of certain parts thereof as well as the relative arrangement and operation of these parts may be readily understood and thoroughly appreciated from the following description in detail thereof, reference being made in this description to the accompanying drawing illustrating the invention and forming a part of this specification.

In the drawing:

Figure 1 is a perspective view of the complete device.

Figure 2 is an enlarged sectional view taken diametrically through the device in line with the tape guide aperture.

Figure 3 is a top plan view, with the top plate of the casing removed.

Figure 4 is a perspective view of the several parts of the device, in exploded relation, and Figure 5 is a detail horizontal section taken substantially on the line 5—5 of Figure 2.

Referring now to these figures, the invention proposes a device, the casing of which is preferably formed of a moldable material such, for instance, as Celluloid, including a pair of spaced apart plates 10 and 11, connected and held in spaced apart relation by a wall 12 adjacent their marginal edges. Both the wall 12 and the hereinafter mentioned axial post may be molded with, and as parts of, the bottom plate 10.

In the present instance, the plates 10 and 11 are shown as circular, the wall 12 extending annularly therearound, but it will be obvious that this particular shape may be varied. However, as the device is generally used, the plate 10 of the casing is at the bottom and the plate 11 at the top, and it will be understood that in the hereinafter references to these parts, their shape and relative positions are to be understood in the light of the foregoing.

As shown in the present instance, the annular wall 12 is provided at one point with a slotted opening 13 through which the measuring tape 14, suitably graduated on one or both faces thereof, is guided in its outward movements under manual control and its inward movements under the spring control to be hereinafter referred to.

The tape 14 preferably has its outer free end provided with a loop or handle 15, its inner end being fixed in the vertically slitted portion 16 of the circular wall 17 of a reel generally indicated at 18, around which the measuring tape is wound.

Axially thereof, the base plate 10 of the casing is formed with an integral upstanding post 19 having a diametrical slot 20 as plainly seen in Figures 3, 4 and 5, and it is upon this post that the reel 18 is mounted for rotation by reason of a central opening 21 of the base 22 of said reel, which opening is adapted to receive the post so as to rotatably situate the reel with its base adjacent to the base plate 10 of the casing, to open upwardly toward the top plate 11.

The reel 18 is both rotatable on the post 19 and shiftable upwardly and downwardly and, in order to normally maintain the same in its upper position for a purpose which will be presently made plain, there is disposed upon the base plate 10 a disk or spring plate 23, which, as will be particularly noted from the showing in Figure 4, is cut away wholly within its marginal limits and adjacent to its central portion, as indicated at 24, to form a spring tongue 25 having its free end projecting toward and terminating approximately at the axis of the spring plate 23 and there provided with an opening 26 to surround the post 19 and of appreciably greater diameter than the diameter of the post. The spring tongue 25 is deflected laterally from the plane of the spring plate 23 of which it is a part, and when the spring plate is disposed flatwise on the base plate 10 of the casing, as shown in Figure 2, with the spring tongue 25 extending upwardly and inwardly, its inner end, around the post 19, holds the reel yieldably in its upper position so that the integral upstanding and outwardly angular brake fingers 27 of the wall 17 of the reel engage the lower inner surface of the top plate 11 with a pressure sufficient to brake the reel and prevent its spring-actuated rotation.

A coil spring 28 is utilized within the reel, the outer end 29 of this spring being anchored around a slitted portion 30 of the wall 17 of the reel. The inner end of the spring is reversely curved to provide a portion 31 which, in the assembled position of the parts, extends through the diametrical slot 20 of the post 19 to thus anchor the inner end of the spring. It will be noted from Figure 2, however, that the spring sits downwardly within the reel closely adjacent to the base or bottom plate 22 of the latter and that when the parts are assembled, the upper portion of the post 19 projects substantially above the spring for a purpose which will presently appear. The top plate 11 is formed in its lower surface with a marginal groove 32 receiving the upper edge of the surrounding wall 12 and, although the top plate may be secured to the upper edge of the wall 12 in any suitable manner as by cementing or gluing or by heating and/or crimping, additional means are provided to hold the top plate against rotative movement relative to the bottom plate 10 since, of course, it is imperative for proper braking action of the reel that the top plate, against which the braking action takes place, be held immovable.

For the above purpose, the top plate 11 is provided centrally of its lower or inner surface with a boss 33 and a vertical bore 34 extending into this boss which receives the upstanding end of the post 19 or, in other words, that portion of the upper end of the post which projects above the reel controlling spring 28. Furthermore, within the bore 34 of the boss 33 there are formed diametrically opposed ribs 35 which, when the post is extended into the bore 34, extend into the side portions of the diametrical slot 20 of the post 19 to thus lock the top plate 11 in non-rotatable relation with respect to the post 19 and thus to the base plate 10.

In addition to the bore 34, the top plate has an axial opening 36 therethrough opening into the upper inner end of bore 34 to receive the externally projecting end 37 of a plunger 38, which in the present instance is formed of flat metal and is sufficiently thin to movably seat lengthwise of and within the diametrical slot 20 of the post 19 alongside the anchoring inner end portion 31 of spring 28. At its lower end the plunger 38 has laterally projecting arms 39 below the base plate 22 of the reel 18 so as to form a depressor head resting on the upper surface of the spring tongue 25. The body of this plunger 38 is preferably equal in width to the full diameter of the post 19, its upwardly extending portion 37 which extends through the bore 34 and the opening 36 of the top plate being substantially reduced in width and its externally projecting end being housed within a thimble 40 extending through the opening 36 with its flange around its open end seated outwardly against the annular shoulder between opening 36 and the upper inner end of bore 34.

Thus as to operation, it is obvious that with the parts in the position shown in Figure 2, that is, in normal position, the tape 14 may be pulled outwardly through the guide slot 13, manual force overcoming the frictional resistance created by the brake fingers 27 of the reel against the lower inner surface of top plate 11, which frictional resistance is due to the yieldable support of the reel in its upper position by pressure of the spring tongue 25 upwardly against the brace of the reel, and is sufficient to prevent reverse rotation of the reel under the tension of its actuating spring 29. When it is desired that the withdrawn portion of the measuring tape 14 be retracted within the casing, the operator presses upon axially externally upstanding thimble 40, which results in depressing plunger 38 so that its lower head 39 forces the spring tongue 25 downwardly, thus relieving upward pressure against the reel and relieving the normal pressure of frictional contact between the brake fingers 27 and the lower inner surface of top plate 11, so that the reel spring 28 is permitted to reverse rotation of the reel and rewind the measuring tape thereon.

In the assembly of the parts, the spring plate 23 is first placed in position upon the bottom plate 10 of the casing with the opening 26 of its spring tongue around post 19. The plunger 38 is then set in upright position within the diametrical slot 20 of the post so that it rests on the spring tongue, and then the entire reel assembly, including reel 18 with its internal spring 28 and the measuring tape 14 therearound, is placed in position around the post. The thimble 40 may be then placed on the reduced upper end 37 of plunger 38 and the parts are then ready for the disposition of the top plate 11. In placing the top plate 11 in position, it is merely necessary to register the internal ribs 35 of its boss 33 with the diametrical slot 20 of post 19 in order to permit the upper end of the post to slip into the bore 34, so that the top plate may be pressed downwardly to the position shown in Figure 2 to receive the upper edge of the surrounding wall 12 within its marginal groove 32. During this movement, the upper end of the plunger and its thimble 40 will readily find its way into and through the opening 36, since the plunger is maintained in a truly upright position.

It is then merely necessary to seal the marginal portion of the top plate 11 in connection with the upper edge of the surrounding wall 12, and during this time as well as at any time subsequent thereto, the extension of the post 19 within bore 34 and the engagement of ribs 35 within portions of the diametrical slot 20 in said bore obviously prevent any relative rotation of the top plate 11 with respect to the other portions of the casing to thus relieve undue strain upon the connection between the top plate and the surrounding wall 12, maintaining full efficiency in the braking action between the spring reel and the top plate.

What is claimed is:

1. A device of the character described comprising an upwardly opening reel having a surrounding wall provided at equidistantly spaced points therearound with upstanding outturned brake fingers, a spring within the reel having its outer end connected with a portion of said wall, a measuring tape around the reel having its inner end also connected to a portion of the reel wall, a casing including top and bottom plates and a surrounding wall connecting the marginal portions of said plates and provided with a slotted outlet opening for the outer end of the measuring tape, a post rising axially from the bottom plate and with which the inner end of the reel spring is anchored, a spring plate disposed on the bottom plate of the casing and having an angularly upwardly extending spring tongue, the free end of which surrounds the said post and bears upwardly against the reel to normally hold the latter with its brake fingers in frictional contact with the lower surface of the top plate, and a plunger having its body portion movably disposed in the direction of the length of said post, provided with laterally projecting arms below the reel and between the latter and said spring tongue, the upper portion of said plunger being reduced and projecting exteriorly through the top plate for manual depression to release the reel for rotation.

2. A device of the character described comprising an upwardly opening reel including an annular wall and having at equidistantly spaced points around said wall upwardly and outwardly deflected brake fingers, a spring within the reel engaged at its outer end with said wall, a measuring tape around the reel engaged at its inner end with the said wall, a casing within which the reel is mounted including top and bottom plates with the former of which the brake fingers are engageable to prevent spring-actuated rotation of the reel, and a surrounding wall connecting the marginal portions of said top and bottom plates, a diametrically slotted post rising axially from the bottom plate on which the reel is rotatable and vertically shiftable, and through the slot of which the inner end of the reel spring is anchored, the top plate having means axially thereof to engage the upper end of said post and lock the same against relative rotation, a spring plate disposed on the bottom plate of the casing and having an integral upwardly deflected spring tongue bearing upwardly against the central portion of the reel around said post, and a relatively thin flat plunger movable in the diametrical slot of the post lengthwise of the latter, having laterally extending arms disposed between the reel and the said spring tongue and having an upper laterally reduced portion projecting exteriorly through the top plate for manually depressing the said spring tongue to free the reel for spring-actuated rotation.

3. A device of the character described comprising a spring reel, a measuring tape therearound, a casing including top and bottom plates, the latter having a diametrically slotted axially upstanding post on which the reel is revoluble and through the slot of which the reel spring is anchored, a wall upstanding along the margin of said bottom plate and having a slot through which the tape is guided, said top wall having an axial depending boss provided with a bore to receive the upstanding end of the said post and having therein ribs interfitting portions of the post slot to thus anchor the top plate against rotation relative to the lower plate, said top plate being provided with a marginal groove in which the upper edge of the said wall is fixed, and with an opening therethrough centrally of the said bore, said reel having upstanding angular brake fingers engaging the lower surface of the top plate, a spring plate seated on the bottom plate and engaging the reel to normally urge the latter upwardly, and a plunger movably seated in the post slot having a headed lower end resting on said spring plate and having a reduced upper end extending exteriorly of the top plate through the said opening of the latter.

4. A device of the character described comprising an upwardly opening reel having a surrounding wall provided at equidistantly spaced points therearound with upstanding brake fingers, a spring within the reel having its outer end connected with a portion of said wall, a measuring tape around the reel having its inner end also connected to a portion of the reel wall, a casing including top and bottom plates and a surrounding wall connecting the marginal portions of said plates and provided with a slotted outlet opening for the outer end of the measuring tape, a post rising axially from the bottom plate and with which the inner end of the reel spring is anchored, a spring plate disposed on the bottom plate of the casing and having an upwardly extending spring tongue, the free end of which bears upwardly against the reel to normally hold the latter with its brake fingers in frictional contact with the lower surface of the top plate, and a plunger having its body portion movably disposed in the direction of the length of said post, and having its inner end disposed between the reel and said spring tongue and in contact with the latter, the upper portion of said plunger projecting exteriorly through the top plate for manual depression to depress said spring tongue to release the reel for rotation.

WALLACE J. WOLF.